United States Patent [19]

Giannini

[11] Patent Number: 5,015,061
[45] Date of Patent: May 14, 1991

[54] OPTICAL CONNECTOR

[76] Inventor: Gabriel M. Giannini, 51555 Madison St., Indio, Calif. 92201

[21] Appl. No.: 348,951

[22] Filed: May 8, 1989

Related U.S. Application Data

[63] Continuation of Ser. No. 130,468, Dec. 9, 1987, Pat. No. 4,844,582.

[51] Int. Cl.⁵ .......................... G02B 6/26; G02B 6/36
[52] U.S. Cl. .............................. 350/96.20; 350/96.21
[58] Field of Search ........................ 350/96.20, 96.21; 439/38, 577

[56] References Cited

U.S. PATENT DOCUMENTS

| | | | |
|---|---|---|---|
| 4,004,298 | 1/1977 | Freed | 3/1 |
| 4,062,620 | 12/1977 | Pirolli | 350/96.20 |
| 4,406,515 | 9/1983 | Roberts | 350/96.21 |
| 4,449,784 | 5/1984 | Basov | 350/96.21 |
| 4,597,631 | 7/1986 | Flores | 350/92.20 |
| 4,707,096 | 11/1987 | Moulin | 350/96.21 |
| 4,714,319 | 12/1987 | Szentesi | 350/96.21 |
| 4,723,830 | 2/1988 | Messbauer | 350/92.20 |
| 4,786,135 | 11/1988 | Boero | 350/96.18 |
| 4,844,582 | 7/1989 | Giannini | 350/96.21 |

FOREIGN PATENT DOCUMENTS 2646010 4/1978 Fed. Rep. of Germany.
3319466 3/1984 Fed. Rep. of Germany.

Primary Examiner—Akm Ullah
Attorney, Agent, or Firm—Henri J. A. Charmasson

[57] ABSTRACT

A pair of frusto-conical optical connectors which allow for the grouping of optical connections in a versatile housing where clusters of terminal-holding channels are arranged in a beehive configuration. Automatic alignment of the terminals is achieved by means of magnets of opposite polarity occupying some of these channels. The connectors are particularly adapted to underwater applications or to any other severe environment and hard-to-reach locations where manipulation is limited due to the use of diving suits or robotics. The frusto-conical configuration of sections of the channels and the terminals provides for the use of the connectors as part of bulkheads between two areas with very high differential pressure. The frusto-conical configuration prevents the movement of terminals within the channel toward the low pressure area. The terminal configurations provide for precise juxtaposition of lenses used in the optical connections.

7 Claims, 6 Drawing Sheets

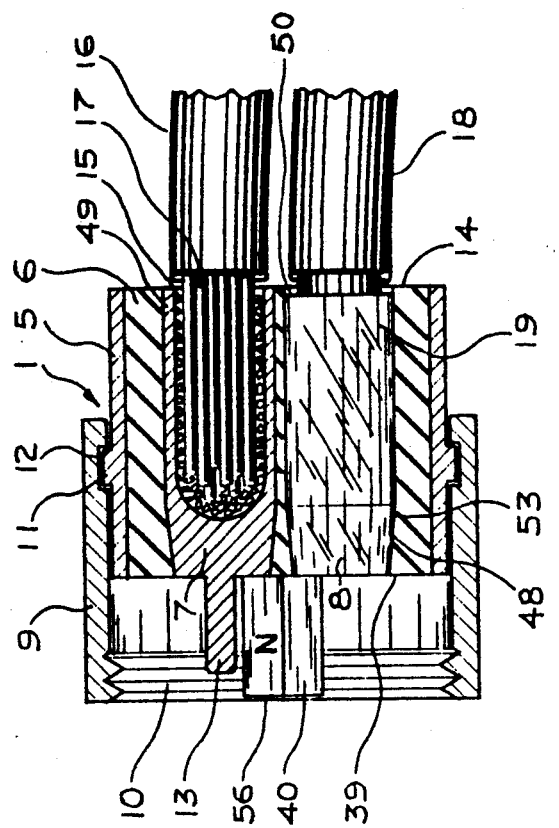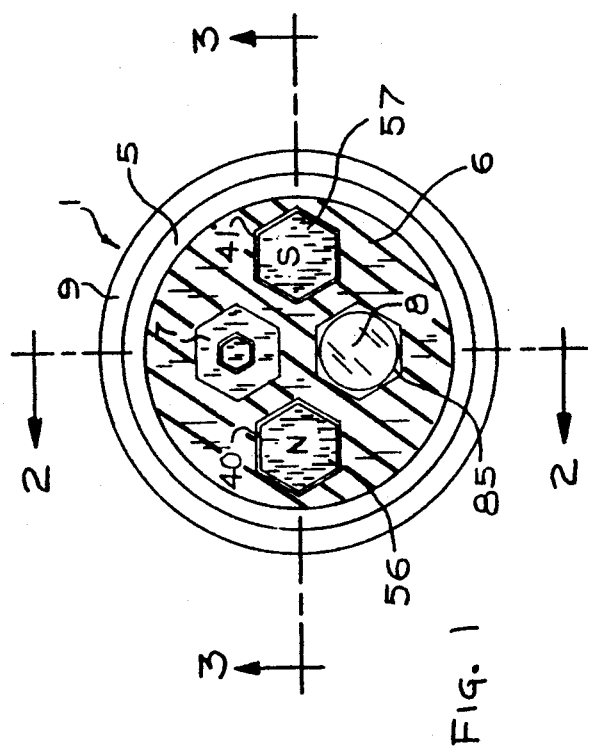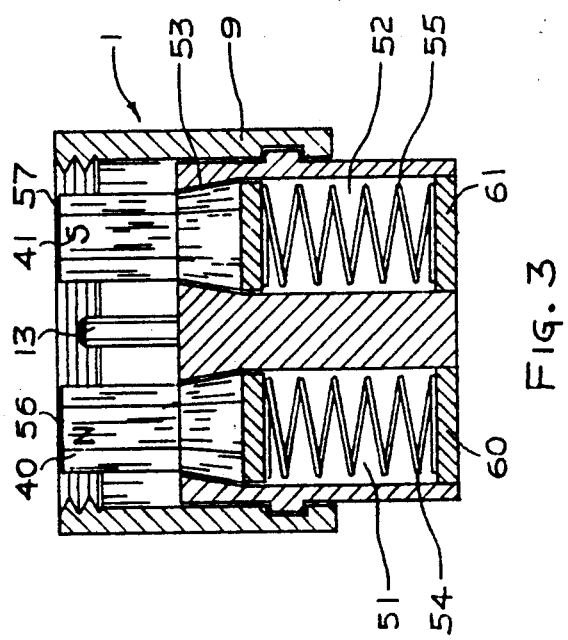

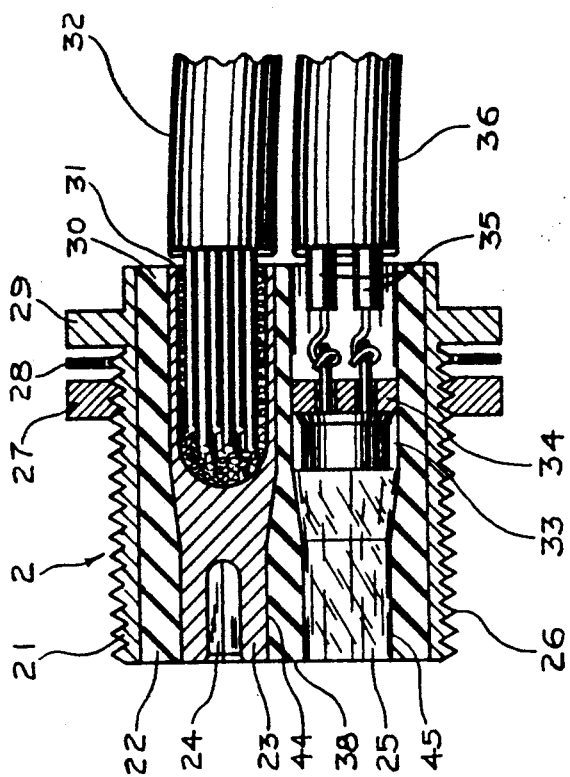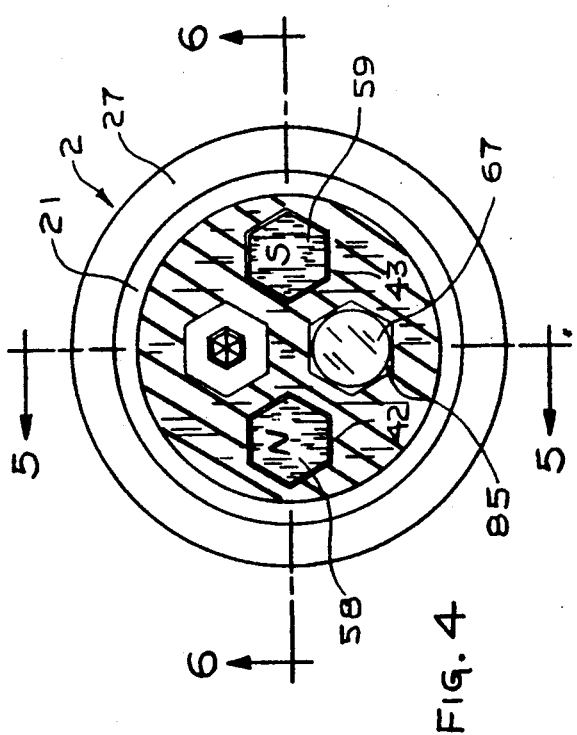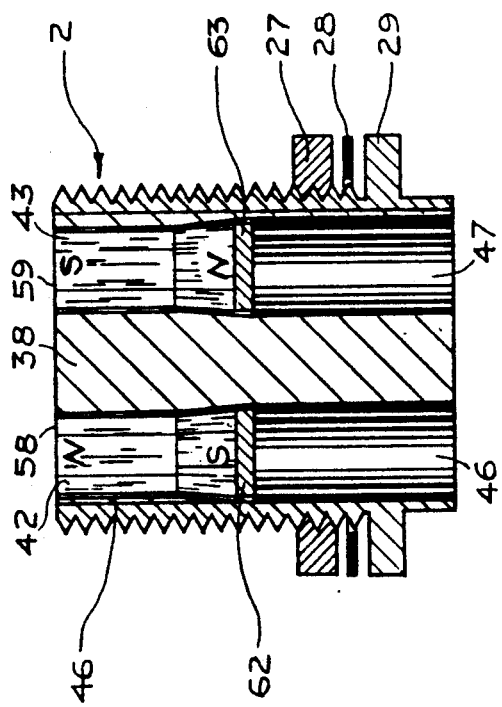

OPTICAL CONNECTOR

PRIOR APPLICATION

This is application is a continuation of copending application No. 07/130,468 filed on Dec. 9, 1987 now U.S. Pat. No. 4,844,582.

FIELD OF THE INVENTION

This invention relates to optical signal transmission devices. More specifically, the invention relates to optical connectors operating under harsh environments.

BACKGROUND OF THE INVENTION

The grouping of individual fiber-optical connections within a single pair of connectors has not been accomplished until now without severe shortcomings, such as poor transmission of light and excessive fragility. These shortcomings are particularly compounded when the hybrid connectors are used underwater or any other kind of severe environment.

To form a reliable optical signal connection, photons must travel in the same axial direction as the waveguide through lenses or fluids having the same index of refraction as the waveguide material. These requirements demand an exact control of the distance between the ends of the fiber's waveguides being connected and/or their associated lenses.

Connectors designed for use underwater are often installed on the interfaces of structures which are subject to tremendous pressure differentials between the inside of the structure and the outside which is exposed to the water pressure. If the pressure difference between the back of the connector and the mating interface exceeds the friction exerted by the body of the connector over the part of the conductor that passes through that body, the optical terminal might be dislodged and fly out of the connector. This is not an uncommon occurrence when connectors are mounted on a bulkhead separating the inside of a deep sea probe from the surrounding waters and in other submarine structures. This requires that underwater connectors exhibit great mechanical simplicity and sturdiness. Furthermore, they should be extremely easy to use due to the fact that underwater manipulation is often impaired by the use of diving suits and that connections and disconnections are sometimes achieved by means of remote devices and robots. There is therefore an acute need for a type of underwater connector that could group fiber-optical connections in a sturdy and easy-to-operate configuration.

SUMMARY OF THE INVENTION

The principal and secondary objects of the invention are:
to provide a versatile pair of connectors which can group fiber-optical connections;
to allow easy substitution or replacement of fiber optical terminals in the same connector pair;
to provide connectors that can be subject to high pressure differentials between their interfaces; and
to provide optical connectors which can be operated with a minimum of manual dexterity.

These and other objects are achieved by means of a pair of optical connectors which group optic terminal contacts clustered in a beehive structure where contacts are automatically aligned by means of opposite polarity magnets installed side by side with the various terminals.

BRIEF DESCRIPTION OF THE DRAWING

FIG. 1 is a end view of a simple hybrid connector designed for attachment to the end of a free-floating cable harness;

FIG. 2 is a cross-sectional view taken along line 2—2 of FIG. 1;

FIG. 3 is a cross-sectional view taken along line 3—3 of FIG. 1;

FIG. 4 is an end view of a mating connector designed for mounting on a bulkhead;

FIG. 5 is a cross-sectional view taken along line 5—5 of FIG. 4;

FIG. 6 is a cross-sectional view taken along line 6—6 of FIG. 4;

DESCRIPTION OF THE PREFERRED EMBODIMENTS OF THE INVENTION

Figure 7:
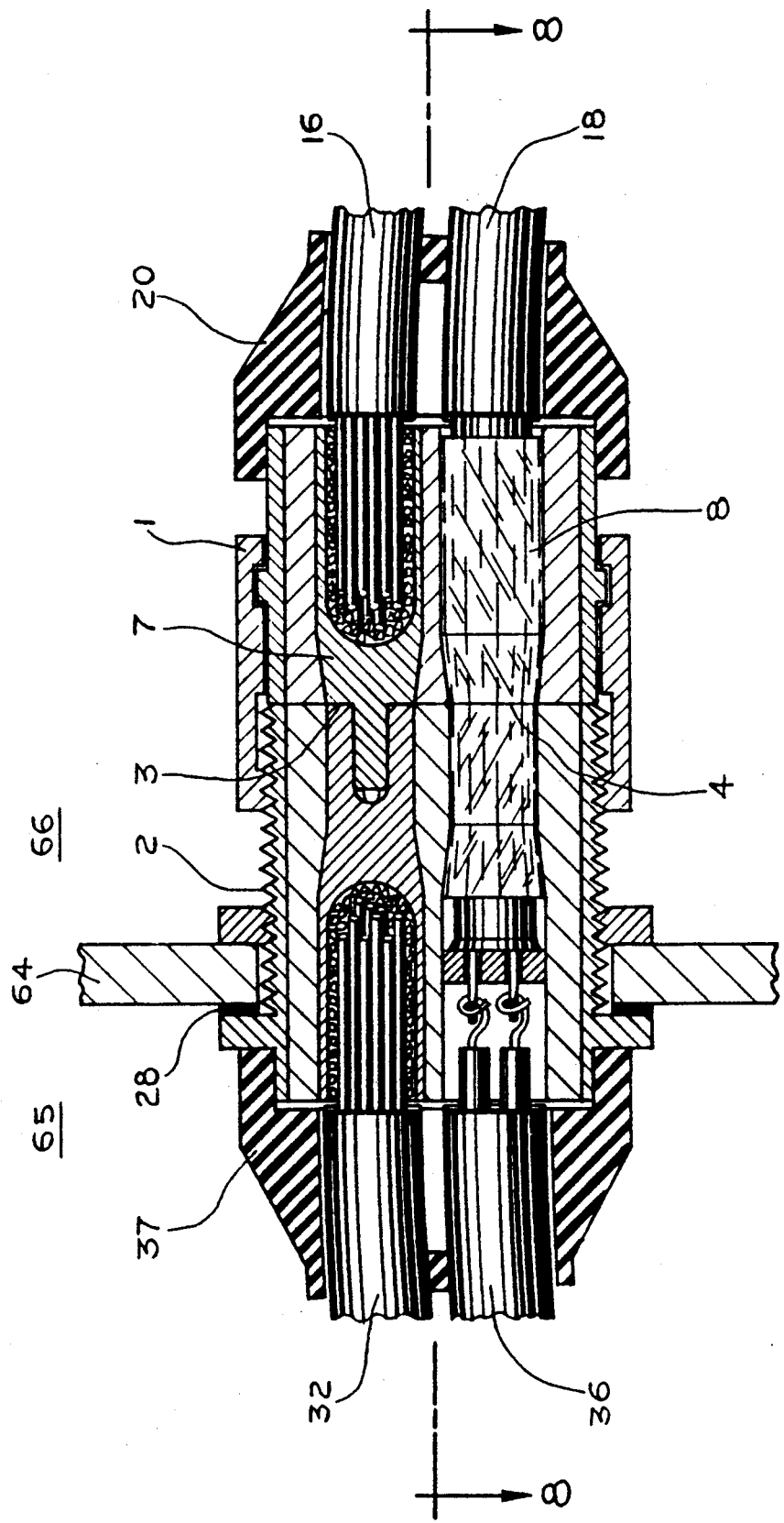
FIG. 7 is a cross-sectional view of the two mated connectors.

Referring now to the drawing, there is shown in FIGS. 1 through 8 a pair of hybrid connectors 1, 2 which in their basic configuration group one electrical contact 3 and one fiber-optical contact 4. The male connector 1 comprises a circular shell 5 which houses a body 6 of insulating material. An electrical terminal 7 is mounted through the insulating body 6 as well as a first half of a cylindrical lens 8 used as a fiber-optical terminal. A freely rotating connecting ring 9 has a thread 10 along the inner periphery of its forward end for attachment to the mating connector 2. The connecting ring is linked to the shell 5 by means of a circular bead 11 formed on the outside of the shell 5 and engaging a groove 12 cut in the inner rearward periphery of the connecting ring 9. The terminal 7 has a jack prong 11 extending beyond the face of the insulating body 6. The terminal 7 extends through the insulating body to its back face 14 where it forms a socket 15 in which the end of an electrical cable 16 can be inserted. In this embodiment, the wire ends 17 of the cable 16 are soldered into the socket 15. The half-cylindrical lens forming the fiber-optical terminal also extends through the insulating body 6 to contact the end of a cable 18 containing an optical-fiber conductor 19. As shown on FIG. 7, the back face 14 of the connector can be sealed by means of a cover 20 which also secures the cables 16 and 18 for proper alignment, and it acts as strain relief.

The mating connector 2 comprises a shell 21 housing a similar insulating body 22 and a female terminal 23 with a socket 24 shaped and dimensioned to intimately engage the male prong 13 of the first terminal 1. A second half of a cylindrical lens 25 forms a fiber-optical terminal designed to interface with the first half 8 of the other connector 1. The outer surface of the shell 21 has a thread designed to mate with the inner thread 10 of the male connector ring 9. A mounting ring 27 engaged on the thread 26 is provided with a seal-washer 28 to secure the connector on a structure against shoulder 29. On the back face 30 of the connector, the female terminal 23 has a socket 31 which receives the ends of the conductors of an electrical cable 32. The back face of the half-cylindrical lens 25 rests against an optical receiver 33 such as a photosensor. The optical receiver is held in place by a ring 34. The electrical terminals of the receiver 33 are connected to a pair of wires 35 of output cable 36. As in the male connector 1, a back cover 37 shown in FIG. 7 is used to secure the cables 32 and 36. The mating interface 38 at the forward end of the female connector 2 is shaped and dimensioned to intimately contact the mating interface 39 of the male connector 1, so that the two cylindrical lense sections 8 and 25 abut each other in perfect axial alignment when the two connectors 1 and 2 are brought together. In order to facilitate the alignment of the electrical terminals and the fiber-optical terminals when the two connectors are brought together, each connector comprises a pair of magnets arranged in opposite polarities as further explained below. A first magnet 40 in the insulating body of the male connector 1 presents its north face forward while a second magnet 41 diametrically opposed to the first one presents its south end. In the female connector 2 a first magnet 42 presents its north end on the interface 38 while the second magnet 43 presents its south end.

It should be noted that the electrical terminals 7, 23, the cylindrical lens sections 8, 25, and the magnets 40, 41, 42 and 43 in both connectors have a frustro-conical section 48 which is commensurate with a section of each of the cavities 49, 50, 51 and 52 in which they are located which is also frustro-conical as shown at 53. While the magnets in the female connectors 1 are stationary, the magnets 40 and 41 in the male connector 1 which normally extend beyond the mating interface 39 under the bias of coil springs 54 and 55, will retract into the cavities 51 and 52 when the two connectors are mated. As the two connectors 1 and 2 are brought together the north end 56 of magnet 40 will attract the south end 59 of magnet 43 in the other connector. Similarly, the south end 57 of magnet 41 in the male connector will attract the north end 58 of magnet 42 in the female connector 2. Since the magnets 40 and 41 of the male connector extends slightly beyond the prong 13 of terminal 7 the main body of connector 1 will rotate until the opposite ends of the various magnets contact each other even before the connecting ring 9 engages the housing 21 of the female connector. Thus the electrical contacts and the optical contacts will be automatically aligned with each other. As the connecting ring 9 is screwed upon the shell of the female connector the magnets 40 and 41 in the male connector will slowly withdraw, allowing the prong 13 to penetrate the socket 24 of the female connector until such time as the cylindrical lens section 8 and 25 abut each other. In this process, a good electrical connection is made between terminals 7 and 23 due to the wiping effect which takes place between the prong 13 and the socket 24, while a precise alignment and gentle meeting of the ends of the two cylindrical lense sections 8 and 25 takes place.

In the construction of the male connector 1, plugs 60 and 61 at the back end of cavities 51 and 52 provide the barrier for the springs 54 and 55. In the construction of the female connector 2, plugs 62 and 63 hold the two magnets 42 and 43 into place.

Figure 8:
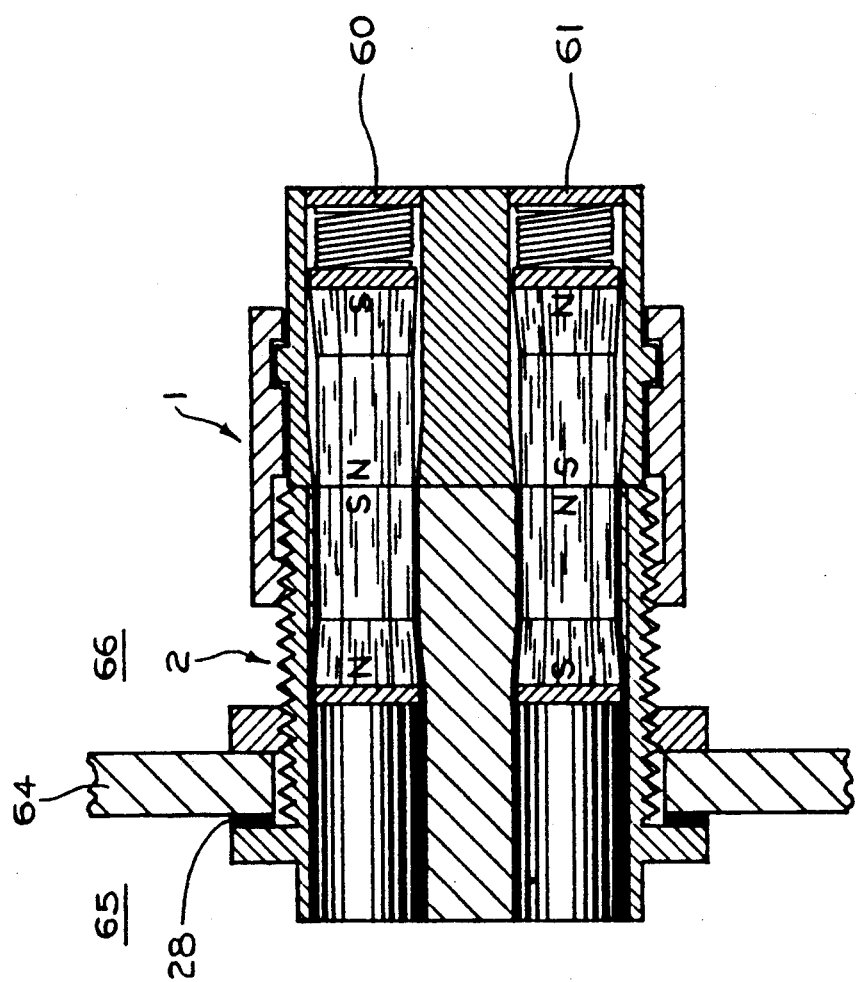
FIG. 8 is a partial cross-sectional view taken along line 8—8 of FIG. 7.
Figure 9A:
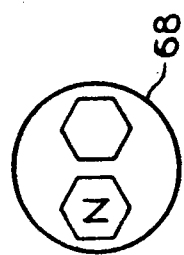
FIG. 9a through 9e illustrate the geometrical arrangement of clusters of terminals in various sized connectors.
Figure 9B:
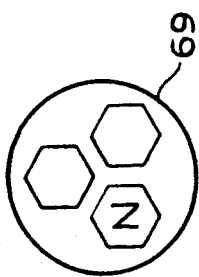
Figure 9C:
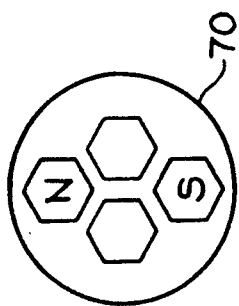
Figure 9D:
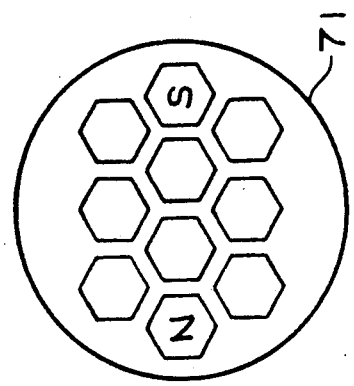
Figure 9E:
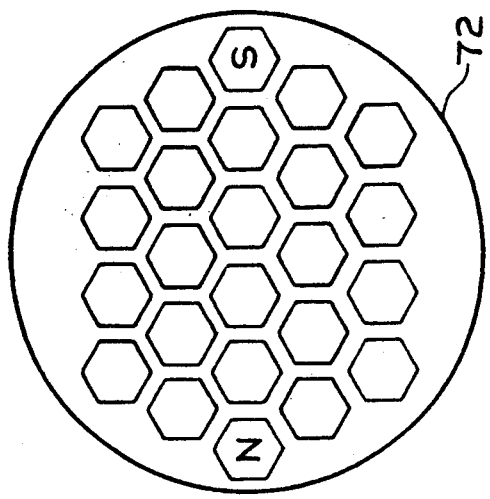

Turning now to FIGS. 7 and 8, the female connector 2 is shown mounted across a bulkhead 64 which separates a high pressure area 65 from a low pressure area 66. Such a situation exists, for example, when the female connector 2 is installed in the wall of a underwater structure, where the exterior of the structure 65 is subject to high water pressure while the inside 66 may be at regular atmospheric pressure. In this situation the frustro-conical shape of the electrical terminal 23, lens section 25 and magnets 42 and 43 (see FIGS. 5 & 6) will prevent them from being dislodged from their cavity in the insulating body 22 (see FIG. 6) under the effect of the pressure differential between the two sides of the bulkhead 64. The frustro-conical sections of the magnets and electrical or optical terminals may be formed about the front ends of the terminals as illustrated in FIG. 2, about the rear ends of the terminals as illustrated in FIGS. 3 and 6 or could extend over the entire length of the magnets or terminal. Such a conically shaped terminal constitutes an advantageous penetrator through a bulkhead or other septum placed between two areas subject to large pressure differentials. It should be noted that the cavities holding the terminals and magnets have an hexagonal cross-section. While the electrical terminals 7 and 23 (see FIG. 5) and the magnets 40, 41, 42 and 43 (see FIGS. 1 & 4) can easily be made in an hexagonal configuration, cylindrical lenses 8 and 25 (see FIGS. 1 & 5) need to be fitted into a sleeve 67 (see FIG. 4) whose outside periphery is hexagonal but which has a cylindrical interior that follows closely the profile of the cylindrical lens. The hexagonal shape has been selected to allow the clustering of a plurality of terminals and magnets in a compact cylindrical shell. Other examples of cluster configurations 68, 69, 70, 71 and 72 are illustrated in FIGS. 9a through 9e. Magnets are distinguished from electrical or fiber-optical terminals by their north or south polarity markings. Thus the hexagonal shape of the cavity's terminals and magnets allow for a compact beehive configuration within a cylindrical shell. As the number of terminals increases the proportion of unused space in the insulating body of the connector decreases substantially. Furthermore, by standardizing the outside shapes of the terminals and magnets the number of terminals, their types and locations within the cluster can be easily modified by substitution, thus offering not only a great versatility in the manufacture of the connectors but also easy field modifications.

Figure 10:
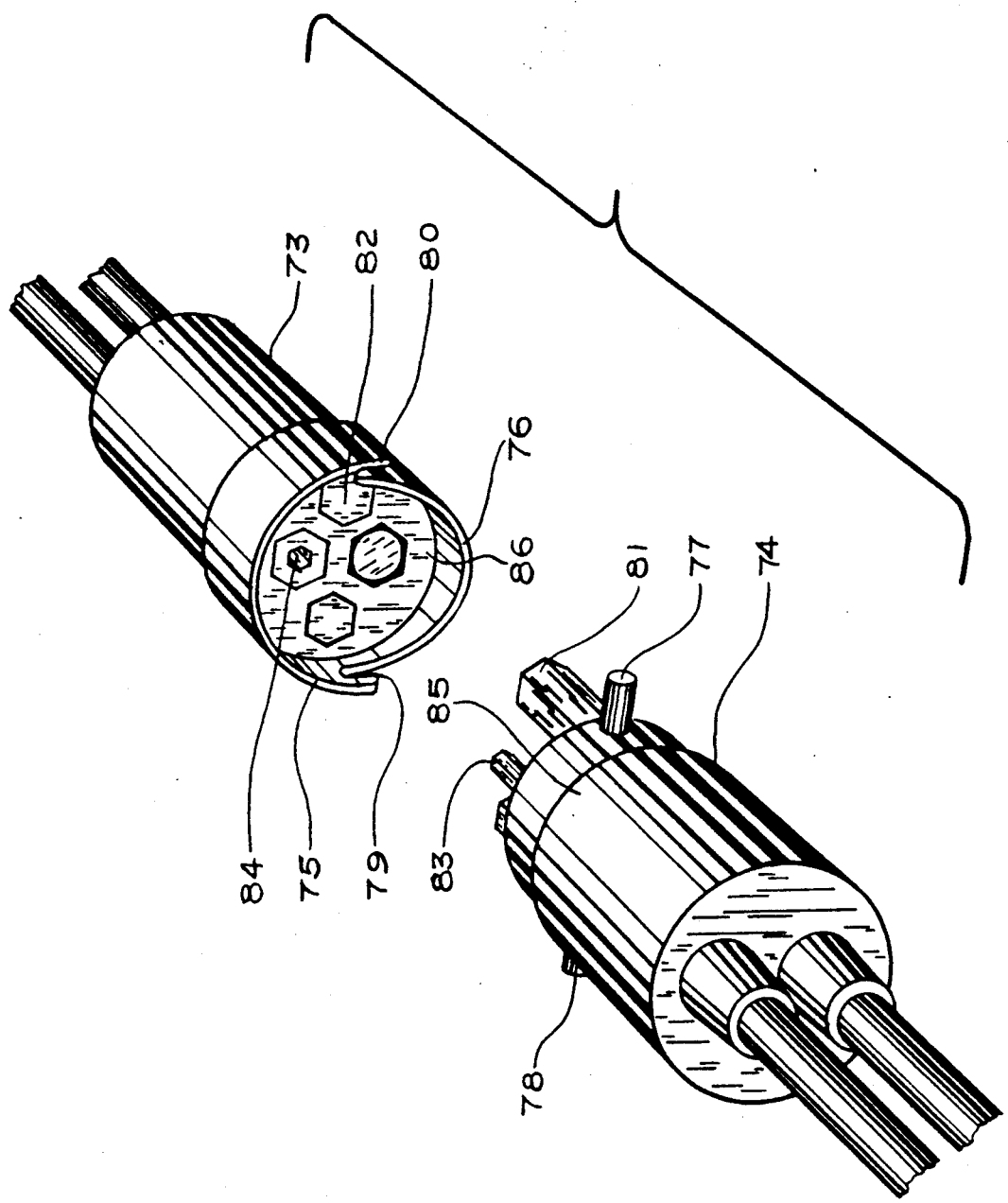
FIG. 10 is a perspective view of two mating connectors showing their interlocking mechanism.

In FIG. 10, there is illustrated a pair of connectors specifically designed for use in areas where limited manipulation is possible. On the female connector 73 the thread on the outside of the shell has been replaced by a pair of ramps 75 and 76 designed to guide the two diametrically opposed prongs 77 and 78 on the male connector 74 into the recesses 79 and 80 formed at the end of the ramps. It should be understood that either the body 85 of the male connector should be allowed to rotate freely in relation to the two prongs 77 and 78, or the body 86 of the female connector 73 should be free to rotate in relation to the ramps 75 and 76. When the two connectors are brought together the magnets 81 and 82 will attract each other thus positioning the two bodies 85 and 86 in proper alignment so that the prong 83 of the electrical terminal will be lined up with the socket 84 in the other connector. This type of connector would be particularly adapted for underwater installation where connection may be made by individuals with limited dexterity due to the use of a diving suit, by robots or other forms of remote control.

While the preferred embodiments of the invention have been described, it should be understood that modifications can be made thereof and other embodiments may be devised without departing from the spirit of the invention and the scope of the appended claims.

What is claimed is:

1. A pair of mating connectors for transferring optical signals from at least one fiber-optic cable to another optical device which comprises:
    each of said connectors having a mating interface shaped and dimensioned to intimately contact the mating interface of the other connector;
    means, for transferring said optical signals, comprising at least one optical terminal in optical alignment with said cable and with said other optical device when said mating interfaces are brought together; and
    at least one channel in each of said connectors opening into said interface, each of said channels having a frusto-oconical area tapering towards said mating interface, wherein each of said terminals occupies one of said channels each said terminals has a corresponding frustroconical sections dimensioned to intimately rest within said frustroconical area and to prevent any axial movement of said terminal toward said interfaces;
    wherein each of said channels has an hexagonal, radial cross-section; and
    wherein each of said terminal comprises a spherical lens in two half sections; said sections being housed in two opposite channels of said connectors so that the two half sections abut each other in a complete spherical lens configuration when said mating interfaces are brought together.

2. The connectors claimed in claim 1 which also comprises means, for automatically aligning said optical terminal when said mating interfaces are brought together.

3. The connectors claimed in claim 2, wherein said means for automatically aligning comprise at least one pair of magnets, one of said magnets being housed in one of the channels of said first connector and the other magnet being housed in one channel of the other connector.

4. The connectors claimed in claim 3, wherein said magnets are positioned in said channels to place ends of opposite polarity in the respective interfaces of said connectors.

5. The connectors claimed in claim 3, wherein said channels are grouped in a generally cylindrical cluster about the mating axes of said connectors.

6. The connectors claimed in claim 3, wherein said channels are grouped in a generally beehive-like cluster about the mating axes of said connectors.

7. The connectors claimed in claim 3, wherein said mating interfaces comprise means for mechanically interlocking said connectors together.

* * * * *